(12) United States Patent
Krivoy et al.

(10) Patent No.: US 9,964,989 B2
(45) Date of Patent: May 8, 2018

(54) ORBITING HINGE

(71) Applicant: Intel Corporation, Santa Clara, CA (US)

(72) Inventors: Raul Krivoy, Beaverton, OR (US); Denica N. Larsen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/998,161

(22) Filed: Dec. 24, 2015

(65) Prior Publication Data
US 2017/0185104 A1    Jun. 29, 2017

(51) Int. Cl.
*E05D 1/00*    (2006.01)
*E05D 3/06*    (2006.01)
*G06F 1/16*    (2006.01)
*E05D 11/00*    (2006.01)

(52) U.S. Cl.
CPC ............ *G06F 1/1618* (2013.01); *E05D 3/06* (2013.01); *E05D 11/0081* (2013.01); *G06F 1/1637* (2013.01); *G06F 1/1662* (2013.01); *G06F 1/1681* (2013.01); *E05Y 2900/606* (2013.01)

(58) Field of Classification Search
CPC ........... E05Y 2201/71; E05Y 2900/606; E05Y 2900/60; G06F 1/1681; H04M 1/02; H04M 1/023; H04M 1/0238; H04M 1/022; H04M 1/0225; H04M 1/0218; H04M 1/0216; E05D 5/00; E05D 5/02; E05D 5/023; E05D 5/0238; E05D 11/1021; E05D 3/06; E05D 3/12; E05D 3/122; E05D 3/16; E05D 15/32; E05D 5/16; Y10T 16/547; Y10T 16/5257; Y10T 16/525

See application file for complete search history.

(56) References Cited

U.S. PATENT DOCUMENTS

| | | | | | |
|---|---|---|---|---|---|
| 3,386,128 | A | * | 6/1968 | Vyvyan | E05D 1/00 16/225 |
| 4,558,911 | A | * | 12/1985 | Ruoff | B25J 9/104 338/79 |
| 4,619,304 | A | * | 10/1986 | Smith | E05D 1/00 16/226 |
| 4,843,679 | A | * | 7/1989 | Maidment | E04B 2/7429 16/227 |
| 5,048,585 | A | * | 9/1991 | Miller | A47G 5/00 16/227 |
| 5,187,897 | A | * | 2/1993 | Maidment | E05D 1/02 16/227 |
| 5,541,813 | A | * | 7/1996 | Satoh | G06F 1/1616 16/223 |

(Continued)

*Primary Examiner* — Chuck Mah
(74) *Attorney, Agent, or Firm* — Patent Capital Group

(57) ABSTRACT

Particular embodiments described herein provide for an electronic device, such as a notebook computer or laptop that includes a circuit board coupled to a plurality of electronic components (which includes any type of components, elements, circuitry, etc.). One particular example implementation of the electronic device may include a first body coupled to a first housing, a second body coupled to a second housing, and two or more taut flexible bands, wherein the taut flexible bands couple the first body to the second body and allow for timed rotation of the first housing relative to the second housing. In some examples, the hinge is a low profile hinge and can rotate about three hundred and sixty degrees.

7 Claims, 10 Drawing Sheets

(56) References Cited

U.S. PATENT DOCUMENTS

| | | | | |
|---|---|---|---|---|
| 7,082,318 | B2* | 7/2006 | Wilson | H04M 1/0216 |
| | | | | 455/550.1 |
| 7,328,481 | B2* | 2/2008 | Barnett | E05D 3/08 |
| | | | | 16/227 |
| 7,426,406 | B2* | 9/2008 | Maatta | G06F 1/1681 |
| | | | | 16/353 |
| 8,959,719 | B2* | 2/2015 | Hsu | G06F 1/1618 |
| | | | | 16/303 |
| 9,604,716 | B2* | 3/2017 | Casse | B64C 9/02 |
| 2005/0175399 | A1* | 8/2005 | Perez-Sanchez | B64C 9/02 |
| | | | | 403/256 |
| 2010/0024169 | A1* | 2/2010 | Self | A47K 3/36 |
| | | | | 16/354 |
| 2011/0157780 | A1* | 6/2011 | Wang | G06F 1/1681 |
| | | | | 361/679.01 |
| 2012/0176736 | A1* | 7/2012 | Apgar | B32B 25/10 |
| | | | | 361/679.01 |
| 2014/0373654 | A1* | 12/2014 | Hsu | G06F 1/1681 |
| | | | | 74/96 |
| 2015/0016040 | A1* | 1/2015 | Hood, III | E05D 7/00 |
| | | | | 361/679.27 |
| 2015/0055287 | A1* | 2/2015 | Seo | G06F 1/1652 |
| | | | | 361/679.27 |
| 2015/0378400 | A1* | 12/2015 | Sprenger | G06F 1/1681 |
| | | | | 361/679.55 |
| 2016/0342180 | A1* | 11/2016 | Xin | G06F 1/1616 |

* cited by examiner

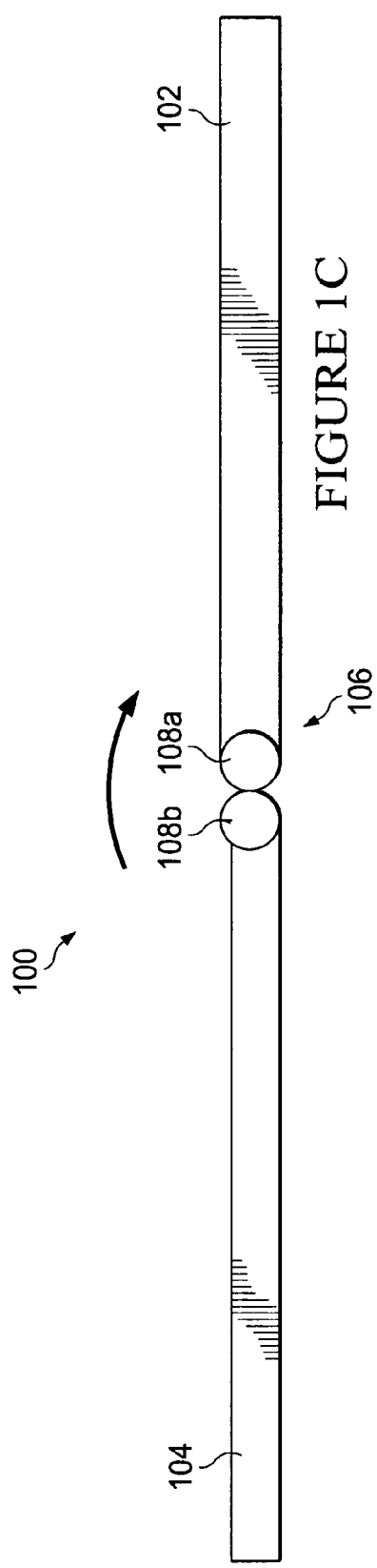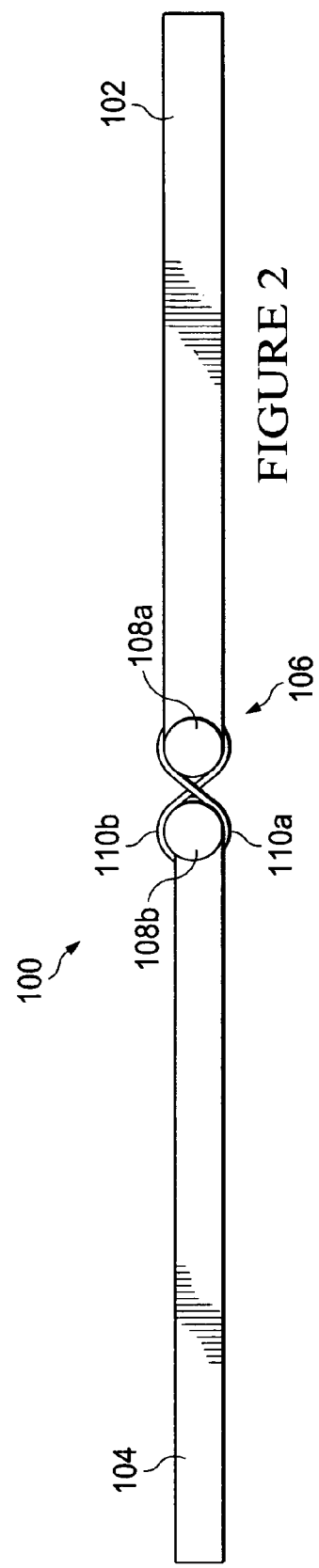

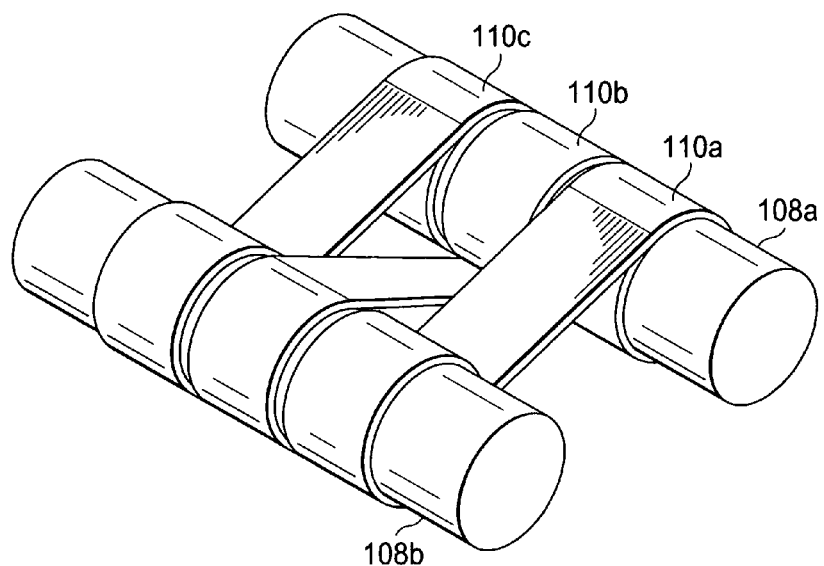
FIGURE 3
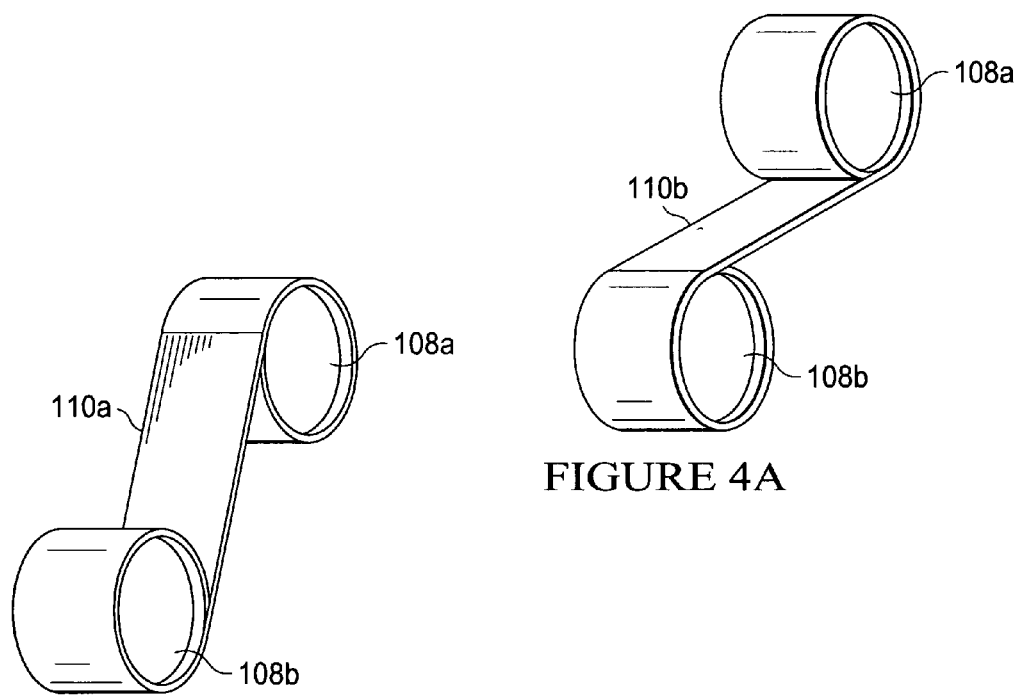
FIGURE 4A
FIGURE 4B

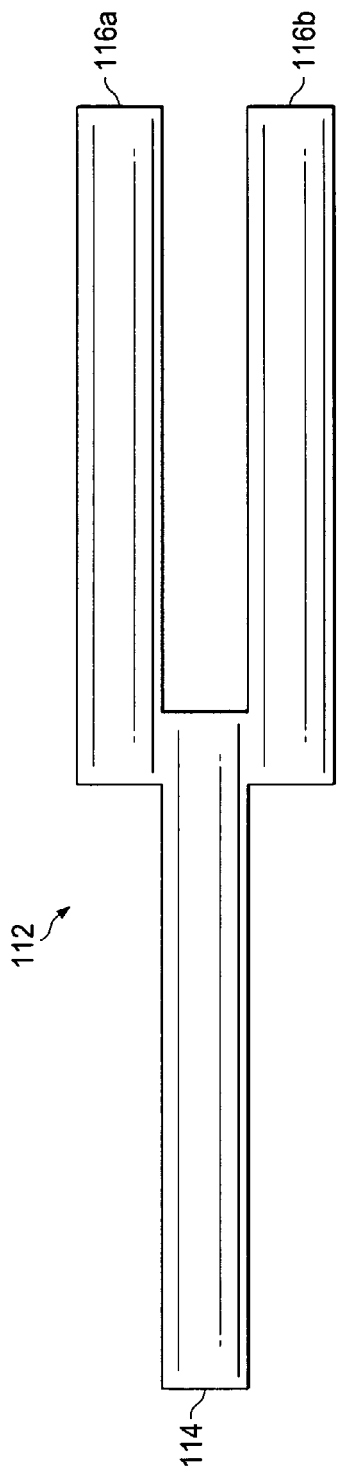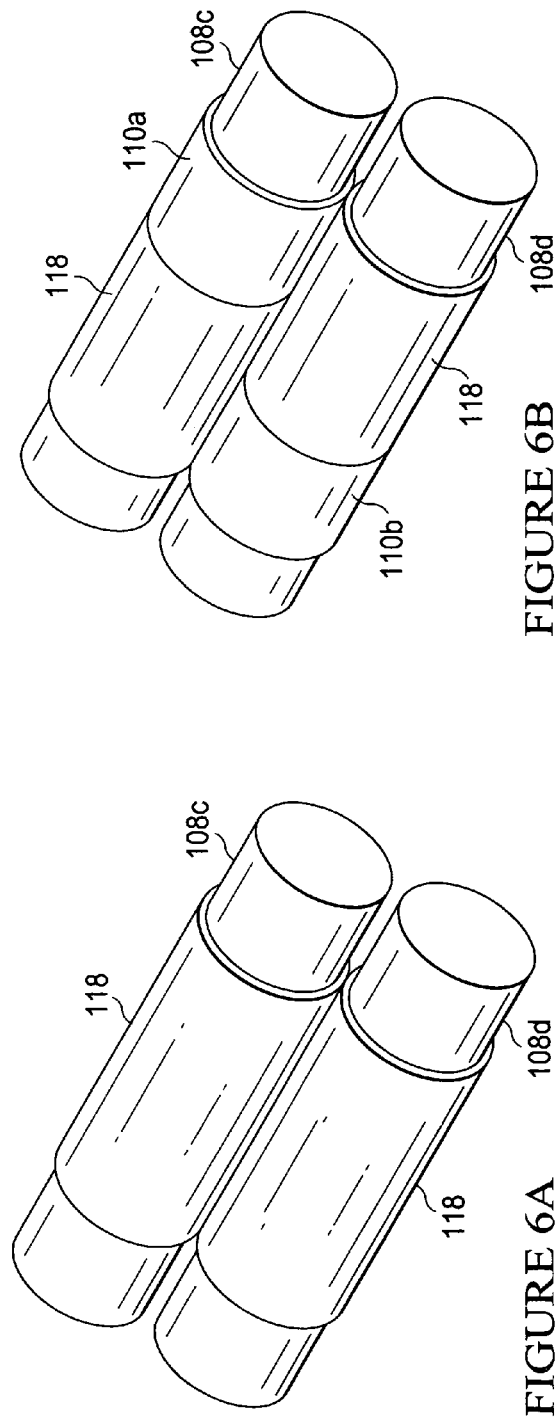

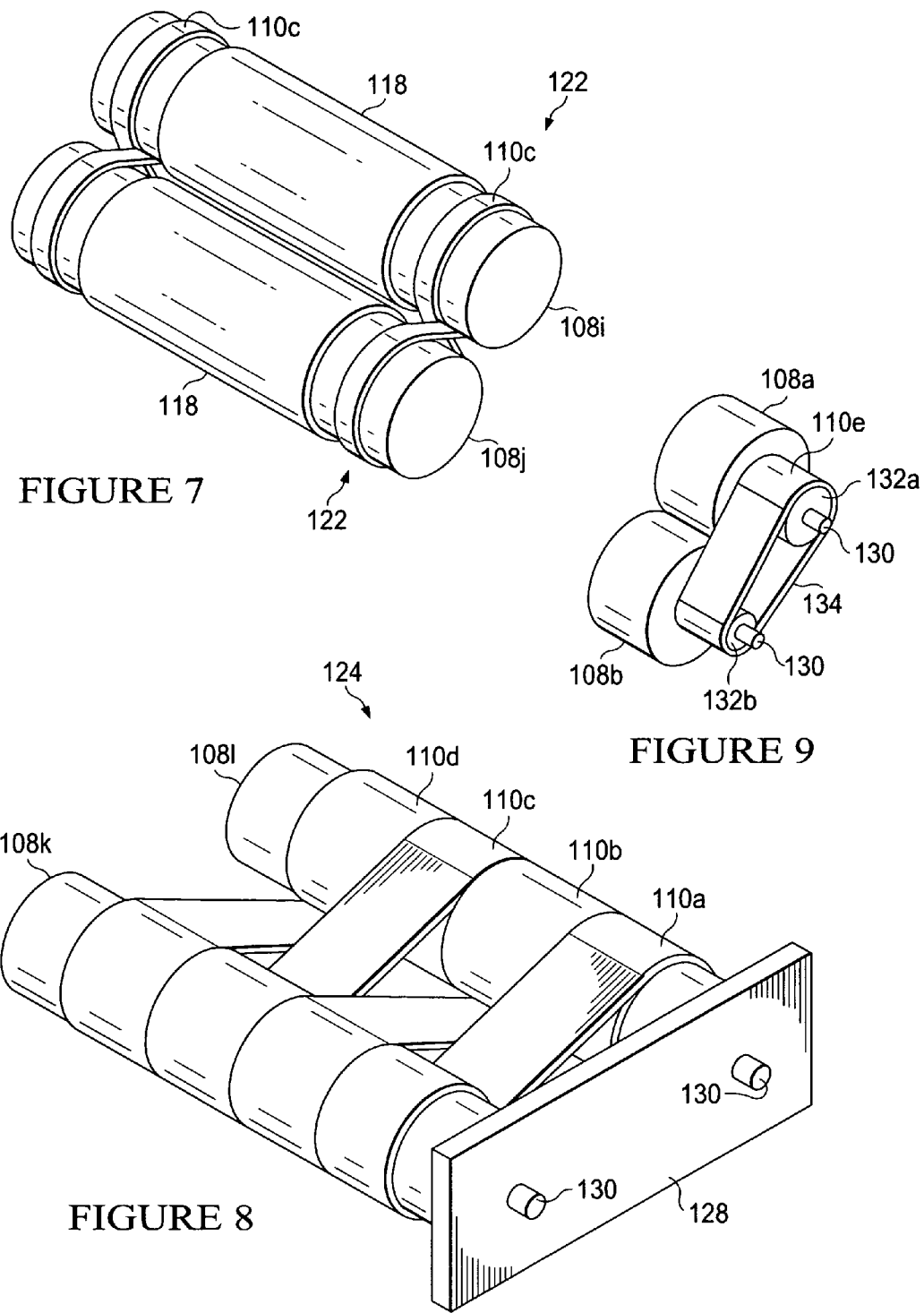

ORBITING HINGE

FIELD OF THE DISCLOSURE

Embodiments described herein generally relate to the field of hinges, and more particularly, to low-profile hinges for an electronic device.

BACKGROUND

End users have more electronic device choices than ever before. A number of prominent technological trends are currently afoot (e.g., more computing devices, more devices that can change into different configurations, etc.), and these trends are changing the electronic device landscape. One of the technological trends is a hybrid laptop (e.g., a convertible computer, fold over notebook, etc.). A hybrid laptop, is a one-piece mobile computer that can include a laptop configuration and a tablet configuration. To convert from the laptop configuration to the tablet configuration, often the display or screen can rotate, twist, or spin over a keyboard. While hybrid laptops are a compelling way of delivering convertibility from a laptop configuration to a tablet configuration, in some designs, the hinge can be bulky and limit the form-factor of the device.

BRIEF DESCRIPTION OF THE DRAWINGS

Embodiments are illustrated by way of example and not by way of limitation in the FIGURES of the accompanying drawings, in which like references indicate similar elements and in which:

FIG. 1C is a simplified side view illustrating an embodiment of an electronic device in a flat configuration, in accordance with one embodiment of the present disclosure;

FIG. 2 is a simplified side view illustrating an embodiment of a portion of a hinge, in accordance with one embodiment of the present disclosure;

FIG. 3 is a simplified orthographic view illustrating an embodiment of a portion of a hinge, in accordance with one embodiment of the present disclosure;

FIG. 4A is a simplified orthographic view illustrating an embodiment of a portion of a hinge, in accordance with one embodiment of the present disclosure;

FIG. 4B is a simplified orthographic view illustrating an embodiment of a portion of a hinge, in accordance with one embodiment of the present disclosure;

FIG. 5 is a simplified orthographic view illustrating an embodiment of a portion of a hinge, in accordance with one embodiment of the present disclosure;

FIG. 6A is a simplified orthographic view illustrating an embodiment of a portion of a hinge, in accordance with one embodiment of the present disclosure;

FIG. 6B is a simplified orthographic view illustrating an embodiment of a portion of a hinge, in accordance with one embodiment of the present disclosure;

FIG. 7 is a simplified orthographic view illustrating an embodiment of a portion of a hinge, in accordance with one embodiment of the present disclosure;

FIG. 8 is a simplified orthographic view illustrating an embodiment of a portion of a hinge, in accordance with one embodiment of the present disclosure;

FIG. 9 is a simplified orthographic view illustrating an embodiment of a portion of a hinge, in accordance with one embodiment of the present disclosure;

Figure 1A:
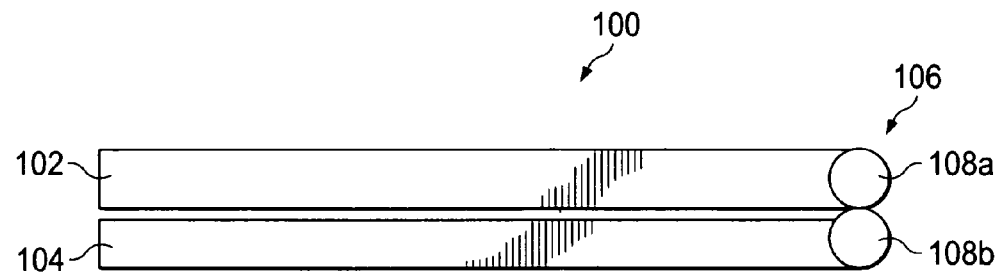
FIG. 1A is a simplified side view illustrating an embodiment of an electronic device in a closed landscape clamshell configuration, in accordance with one embodiment of the present disclosure.

The FIGURES of the drawings are not necessarily drawn to scale, as their dimensions can be varied considerably without departing from the scope of the present disclosure.

DETAILED DESCRIPTION OF THE EMBODIMENTS

Example Embodiments

The following detailed description sets forth example embodiments of apparatuses, methods, and systems relating to an orbiting hinge. Features such as structure(s), function(s), and/or characteristic(s), for example, are described with reference to one embodiment as a matter of convenience; various embodiments may be implemented with any suitable one or more of the described features.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the examples of the present specification, a system and method is provided for a low-profile hinge design. In one example, using an orbiting hinge design, a device (e.g., an electrical device) can be configured with an orbiting hinge such that the hinge form-factor does not limit the scaling of the total z-height of the device. The hinge can be a low-profile, three hundred and sixty degree (360°) hinge. The total thickness of the hinge design can be scaled according to a desired z-height through configuring the dimension of the segment components of the hinge. Hence, the overall z-height of the device can be scaled based on the components of the device (e.g., the display portion and keyboard portion) and not be limited by the hinge size. For example, using the low-profile hinge design, an electronic device can operate in a low-profile clamshell configuration, a low-profile flat configuration, and a low-profile tablet configuration. In addition, the hinge design can allow for different thicknesses between two housings and still retain the low profile 360° rotation. For example, a first housing may have a first thickness while the second housing may have a different second thickness.

The following is an illustration of an example of an orbiting hinge design according to one or more example embodiments of the present specification. It should be noted that the hinge designs disclosed here are given as non-limiting examples only, and it is intended that any suitable technique or configuration should be included in the broad scope of this specification.

Turning to FIG. 1A, FIG. 1A is a simplified orthographic view illustrating an embodiment of an electronic device 100 in a closed clamshell configuration in accordance with one embodiment of the present disclosure. Electronic device 100 may include a first housing 102, a second housing 104, and a hinge 106. Hinge 106 can include a first body 108a and a second body 108b. Hinge 106 can define an axis of rotation that is shared between first housing 102 and second housing 104. Hinge 106 may be a low-profile hinge. The term low-profile hinge includes a hinge with a low, flat, or relatively flat profile with a low total z-height. As used throughout this Specification, the z-height is the height on the z axis of an X, Y, Z Cartesian coordinate system.

In one or more embodiments, electronic device 100 is a notebook computer or laptop computer. In still other embodiments, electronic device 100 may be any suitable electronic device having a display such as a mobile device, a tablet computer and/or a tablet device (e.g., iPad™), phablet, a personal digital assistant (PDA), a smartphone, an audio system, a movie player of any type, a computer docking station, a handheld game console, etc. In yet another embodiment, most of the electronics (e.g., processor, memory, etc.) for electronic device 100 reside in second housing 104.

In one or more embodiments, second housing 104 can function as an input device and may include a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

Figure 1B:
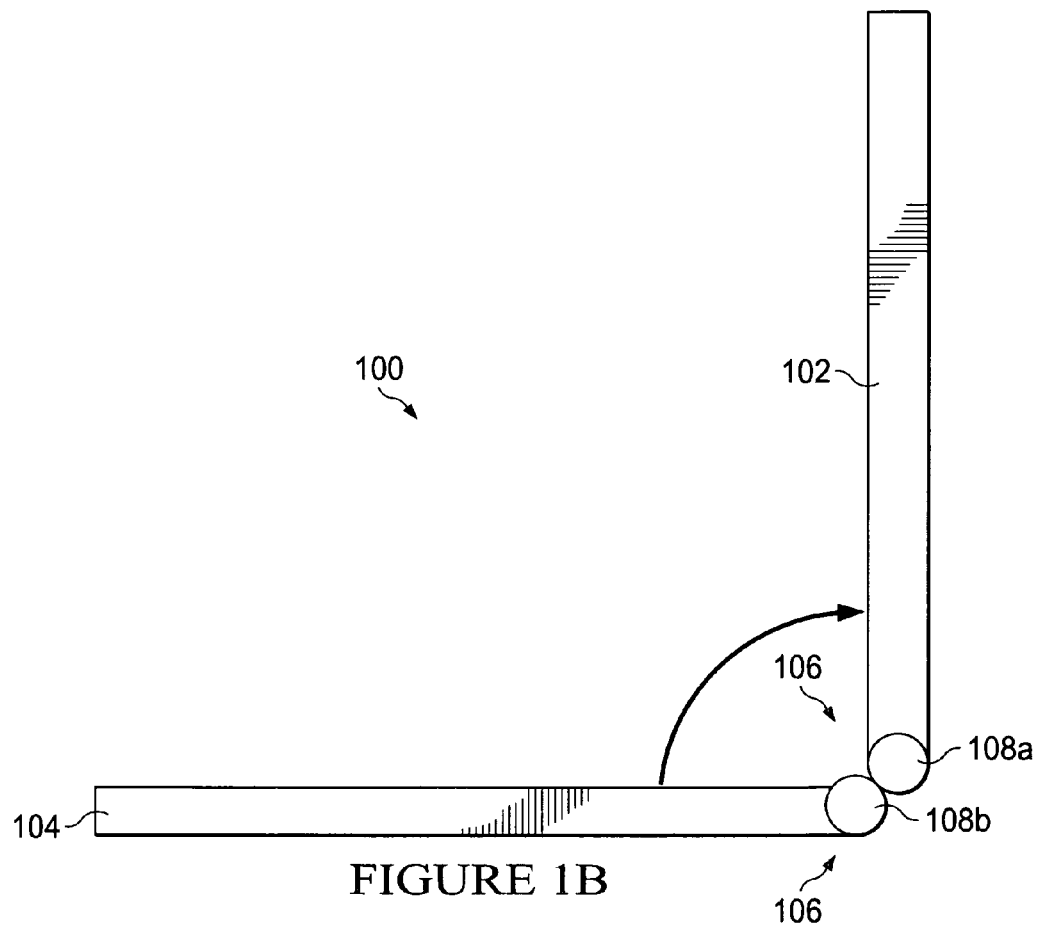
FIG. 1B is a simplified side view illustrating an embodiment of an electronic device in an open clamshell configuration, in accordance with one embodiment of the present disclosure.

Turning to FIG. 1B, FIG. 1B is a simplified orthographic view of electronic device 100 in an open clamshell configuration in accordance with one embodiment of the present disclosure. First housing 102 can include a display. Second housing 104 can include a keyboard. In one or more embodiments, the display can be a liquid crystal display (LCD) display screen, a light-emitting diode (LED) display screen, an organic light-emitting diode (OLED) display screen, a plasma display screen, or any other suitable display screen system. Display may be a touchscreen that can detect the presence and location of a touch within the display area. In another embodiment, first housing 102 may include a camera, a microphone, speakers, etc.

Turning to FIG. 1C, FIG. 1C is a simplified orthographic view of electronic device 100 in an open, flat configuration in accordance with one embodiment of the present disclosure. As illustrated, in FIG. 1C, first housing 102 has been rotated on hinge 106 such that first housing 102 is in the same plane as second housing 104. In this configuration, hinge 106 can have a low, flat or relatively flat profile with a low total z-height. In addition, as illustrated in FIG. 1C, the height of first housing 102 can be different than the height of second housing 104

Figure 1D:
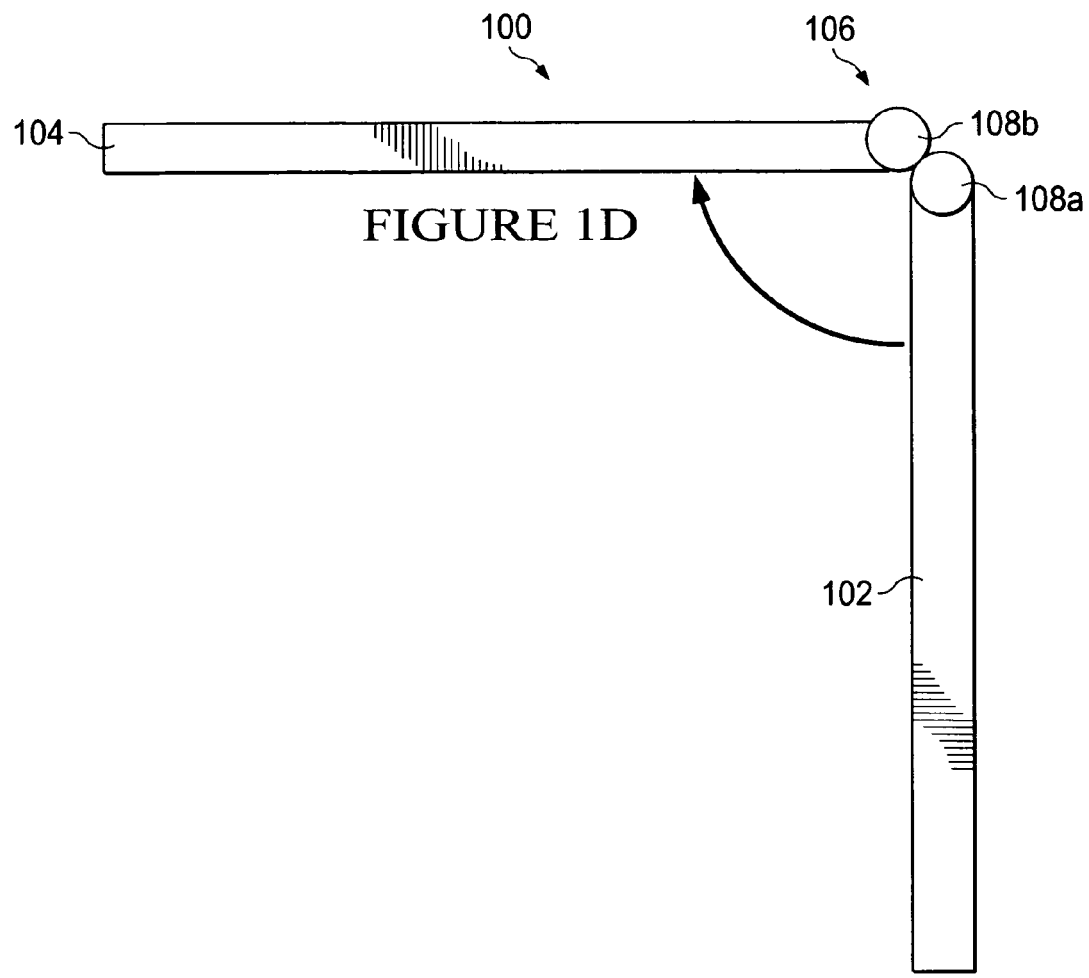
FIG. 1D is a simplified side view illustrating an embodiment of an electronic device in a tablet configuration, in accordance with one embodiment of the present disclosure.
Figure 1E:
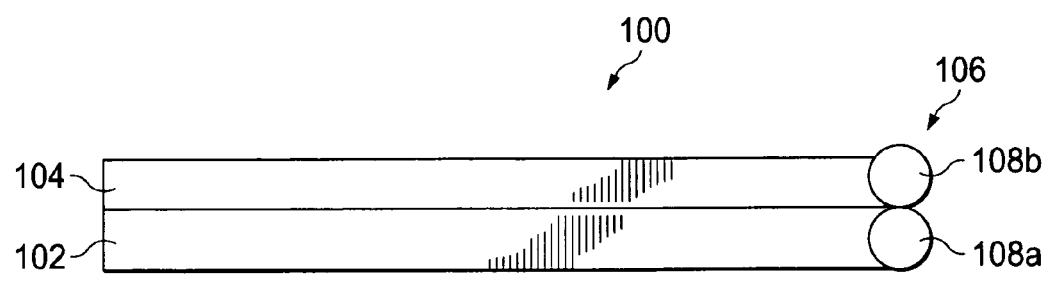
FIG. 1E is a simplified side view illustrating an embodiment of an electronic device in a tablet configuration, in accordance with one embodiment of the present disclosure.

Turning to FIG. 1D, FIG. 1D is a simplified orthographic view of an electronic device in a tablet configuration in accordance with one embodiment of the present disclosure. As illustrated in FIG. 1D, first housing 102 has been rotated around second housing 104 such that the display faces away from the keyboard. Turning to FIG. 1E, FIG. 1E is a simplified orthographic view of an electronic device in a tablet configuration in accordance with one embodiment of the present disclosure. As illustrated in FIG. 1E, first housing 102 has been rotated around second housing 104 such that the display faces away from the keyboard and electronic device 100 is configured as a tablet computer or a tablet device.

In general terms, electronic device 100 may be configured to provide a first housing coupled to a second housing using an orbiting hinge. The orbiting hinge can be configured such that the first housing can be rotated about 360° relative to the second housing. In addition, the thickness or height of the first housing (e.g., first housing 102) can be different than the thickness or height of the second housing (e.g., second housing 104). The overall system can be configured to operate in a low-profile clamshell mode configuration, a low-profile flat mode configuration, and a low-profile tablet mode configuration with a low z-height.

Hinge 106 can include taut flexible bands (TFB) (illustrated in FIG. 2) to mechanically time first body 108a and second body 108b and allow first body 108a and second body 108b to close with no gap or virtually no gap in both a fully closed configuration and a fully open configuration, or at any of the 360° rotational positions. The TFB can also allow for first housing 102 and second housing 104 to be of different thicknesses. The TFB can be configured to maintain timing between first body 108a and second body 108b and allow them to orbit each other in a very compact way while using few parts. In an example, the total thickens of hinge 106 can be less than 10 mm. Current hinge architectures can be either too bulky and not suited for sub 10 mm devices, have hundreds of parts like a watchband type device, keep-a gap between the two halves as when gears are used for timing, and/or cannot handle different thicknesses between the two halves of the device.

Hinge 106 can be configured to combine the concept of two orbiting bodies with the use of the TFB to time the bodies' relative position. For example, first body 108a and second body 108b can be two cylindrical bodies of equal diameter that are tangent or in close proximity to each other. A TFB (e.g., as illustrated in FIG. 2) with ends attached to both first body 108a and second body 108b can provide a mechanical means to keep first body 108a and second body 108b at a constant distance and allow first body 108a and second body 108b to rotate around their axis.

First body 108a and second body 108b can be configured as two cylindrically shaped bodies of equal diameter that have their axes parallel, are located tangentially or in close proximity, have their axis of rotation kept at a fixed distance, and have their rotation around their own axis mechanically timed. This allows first housing 102 to rotate relative to second housing 104. For example, when first body 108a (or second body 108b) is stationary, a rotation of second body 108b (or first body 108a) over its own axis forces it to orbit around first body 108a (or second body 108b). A 360° rotation of the moving body equates to a one hundred and eighty degrees (180°) orbit for its axis of rotation around the center of the stationary body. First body 108a and second body 108b can be linked by the TFB that can be configured to time their movement, thus allowing for one to orbit around the other.

For purposes of illustrating certain example features of electronic device 100, the following foundational information may be viewed as a basis from which the present disclosure may be properly explained. With the recent touch optimized operating system (OS) release, hybrid laptops (e.g., tablets, convertible laptops, clamshell computers, etc.) have become more popular. However, convertible hinge designs have drawbacks with usability issues for certain consumer groups. For example, current hinge solutions can have bulky hinge components that can create a large profile and inhibit the functionality and usability of an electronic device. For example, bulky hinge components can constrain hybrid electronic devices or 2-in-1 form-factor scaling.

A hybrid laptop, is a one-piece mobile computer that can include a laptop configuration and a tablet configuration. To convert from the laptop configuration to the tablet configuration, often the display or screen can rotate, twist, or spin over a keyboard. While hybrid laptops are a compelling way of delivering convertibility from a laptop configuration to a tablet configuration, in some designs, the hinge can be bulky and limit the form-factor of the device. For example, the z-height (height on the z axis of an X, Y, Z, Cartesian coordinate system) of the hybrid laptop is often dependent on the hinge design.

Presently the hybrid electronic devices and convertible form-factor limitations are addressed by enabling low-profile and small form-factor components (e.g., coreless package and motherboard, connectors, batteries, etc.). High density super-capacitors are also being developed to further reduce the battery form-factor and density. In at least one example embodiment discussed herein, an electrical device can be configured with a low-profile hinge design where the overall system can operate in a low-profile clamshell configuration, a low-profile flat configuration, and a low-profile tablet configuration with a low z-height. The low-profile hinge can prevent the hinge form-factor from limiting the scaling of system total z-height by enabling a low-profile, total collapse, 360° hinge using a multiple-friction segment design. The total thickness of the hinge can be scaled according to system z-height through configuring the dimension of segment components. Hence, the overall system z-height can be scaled based on the display portion and keyboard portion and not be limited by the hinge size.

Particular embodiments described herein provide for an electronic device, such as a notebook computer, laptop, cellphone, handheld game console, or other mobile device that includes a circuit board coupled to a plurality of electronic components (which includes any type of components, elements, circuitry, etc.). The electronic device may also include a display portion coupled to a keyboard portion at a hinge. The hinge can be configured to allow a low-profile 360° hinge design for hybrid electronic devices and 2-in-1 applications. The hinge includes orbiting hinge segments that mechanically attach, time, and interlock to each other. The low-profile 360° hinge is mechanically connected to the display portion (e.g., display panel) and keyboard portion (e.g., system board components) to form the electronic device.

The hinge can include connectors and mechanical retentions to provide an electrical connection between the display portion and the keyboard portion. In one embodiment, the electrical connections between a motherboard in the keyboard portion and display components in the display portion are formed through conventional wire-connections via the segment components. In another embodiment, a printed circuit board (PCB) interconnector is used to electrically connect the display portion and the keyboard portion. In other examples, electrical current and signals can be passed through a plug-in connector (e.g., whose male side protrusion connects to first housing 102 and whose female side connects to second housing 104 or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 100. [Thunderbolt™ and the Thunderbolt logo are trademarks of Intel Corporation in the U.S. and/or other countries.]. Virtually any other electrical connection methods could be used and, thus, are clearly within the scope of the present disclosure.

In an embodiment, the majority of the system components (e.g., motherboard, hard drive, battery, communication modules, etc.) remain in the keyboard portion. In certain embodiments the display can be a touchscreen display. The display portion may also contain a camera module, laser based scanner device, microphone, speakers, and/or a wireless module. Such a design allows for the electronic device to function in a clamshell configuration or a tablet configuration. In an embodiment, the display includes a plurality of electrical components that allow the display portion to function or operate as a tablet.

Turning to FIG. 2, FIG. 2 is a simplified side view illustrating an embodiment of electronic device 100, in accordance with one embodiment of the present disclosure. As illustrated in FIG. 2, electronic device can include first housing 102, second housing 104, and hinge 106. Hinge 106 can include first body 108a, second body 108b, and two or more TFBs 110a and 110b. It should be noted that in FIG. 2 and various other Figures throughout this Specification, a gap may be illustrated between first body 102a and second body 102b (or other illustrated bodies). However, this is for illustration purposes only and is used to show TFBs 110a and 110b (or other illustrated TFBs).

TFBs 110a and 110b can be very thin strips of material and can be either independent pieces or a single piece (fashioned like a fork as illustrated in FIG. 5) with a short center section affixed to one of the cylinders and two long ends wrapped in opposite ways around both cylinders and affixed to the other cylinder. Each TFBs (e.g., TFBs 110a and 100b) can be independent pieces, with their ends fashioned like flat spring coils that wrap around first body 108a and second body 108b and are coupled to them. In an example, two external TFBs can be oriented in one direction and a middle TFB can be orientated in the opposite direction (crossing). First body 102a and second body 102b do not necessarily need to be tangential, but they should be kept parallel and separated at a constant or relatively constant distance. TFBs 110a and 110b can be located on the surface of first body 108a and second body 108b or in a channel below the surface of first body 108a and second body 108b so that first body 108a and second body 108b can be in actual tangential contact. Positional torque may be provided using any one of a variety of means and is not the focus of this application.

Turning to FIG. 3, FIG. 3 is a simplified orthographic view illustrating an embodiment of a portion of hinge 106, in accordance with one embodiment of the present disclosure. First body 108a and second body 108b can be coupled together with two or more TFBs. For example, as illustrated in FIG. 3, first body 108a is coupled to second body 108b using TFBs 110a-110c. In an example, each TFB does not touch an adjacent TFB to reduce friction and wear of each TFB edge.

Turning to FIG. 4A, FIG. 4A is a simplified orthographic view illustrating an embodiment of a portion of hinge 106, in accordance with one embodiment of the present disclosure. As illustrated in FIG. 4A, TFB 110b can be wrapped around or coupled to a bottom portion of first body 108a and a top portion of second body 108b. The portion of first body 108a and second body 108b that is coupled to TFB 110b is not important so long as it is on the opposite side of each body.

Turning to FIG. 4B, FIG. 4B is a simplified orthographic view illustrating an embodiment of a portion of hinge 106, in accordance with one embodiment of the present disclosure. As illustrated in FIG. 4B, TFB 110a can be wrapped around a top portion of first body 108a and a bottom portion of second body 108b. The portion of first body 108a and second body 108b that is coupled to TFB 110b is not important so long as it is on the opposite side of each body. In addition, if two or more TFB used, then each TFB should be opposite to the closest TFB.

Turning to FIG. 5, FIG. 5 is a simplified block diagram top view of a portion of a TFB pattern 112 in accordance with one embodiment of the present disclosure. TFB pattern 112 can include a center TFB 114, a first edge TFB 116a, and a second edge TFB 116b. Center TFB 114 can be located between first edge TFB 116a and second edge 116b. In an example, TFB pattern 112 can be coupled to first body 108a and second body 108b to create a configuration similar to the one illustrated in FIG. 3.

Turning to FIG. 6A, FIG. 6A is a simplified orthographic view of a portion of hinge in accordance with one embodiment of the present disclosure. As illustrated in FIG. 6A, first smooth body 108c and a second smooth body 108d can each include a smooth portion 118. Smooth portion 118 may be a smooth compliant material or a hard outer layer on the outer surface of first smooth body 108c and second smooth body 108d. In an example, smooth portion 118 can include some friction to allow for positional torque and allow first housing 102 to be adjusted to a desired angle relative to second housing 104. In another example, smooth portion 118 includes compliant material and through its contact area deformation, provides resistance to allow for positional torque and allow first housing 102 to be adjusted to a desired angle relative to second housing 104. Smooth portion 118 can have a variable width to allow for variable positional torque for different angles between the first housing 102 and the second housing 104.

Turning to FIG. 6B, FIG. 6B is a simplified orthographic view of a portion of hinge in accordance with one embodiment of the present disclosure. As illustrated in FIG. 6B, TFB 110a and 110b have been coupled to first smooth body 108c and second smooth body 108d. Smooth portion 118 can be configured to provide friction for the mechanical timing between first smooth body 108c and second smooth body 108d. In some example, the surface of smooth portion 118 can be adjusted depending on the desired amount of friction desired (e.g., either made more smooth to reduce the friction or more rough to increase the friction). In another example, positional torque is not generated through friction between first smooth body 108c and second smooth body 108d and the cylinders roll on each other almost frictionless and there is no relative motion between their surfaces to create friction. Friction may be added in a way related to orbiting motion of one axis relative to the other.

Turning to FIG. 7, FIG. 7 is a simplified orthographic view of a portion of a hinge in accordance with one embodiment of the present disclosure. As illustrated in FIG. 7, a first recessed body 108i and a second recessed body 108j can include smooth portion 118 and recess 122. Recess 122 can be configured to accommodate one or more TFB 110c. TFB 110c may be coupled to first recessed body 108i and second recessed body 108j in a FIG. 8 or crisscross pattern. In an example, first recessed body 108i and second recessed body 108j can include a deformable material for the surfaces of the cylinders in contact and forming a nip section to provide resistive torque to hinge movement.

Turning to FIG. 8, FIG. 8 is a simplified orthographic view illustrating an embodiment of a hinge in accordance with one embodiment of the present disclosure. In an embodiment, a rotation portion 124 can be coupled to a fixed member 128. For example, fixed member 128 can be couple a first parallel body 108k and a second parallel body 108l using cylindrical axis 130. Fixed member 128 can be configured to keep first parallel body 108k and second parallel body 108l parallel and at a constant distance between each other. In an embodiment, a gap exists between each TFB 110-110d.

Turning to FIG. 9, FIG. 9 is a simplified orthographic view of a portion of a hinge in accordance with one embodiment of the present disclosure. As illustrated in FIG. 11, first body 108a and second body 108b can each include cylindrical axis 130. A TFB 110e can be coupled to first body 108a using first TFB coupler 132a and to second body 108b using second TFB coupler 132b. In an example, first body 108a and second body 108b may be timed using two or more FTBs (e.g., as illustrated in FIG. 3), and a resistive torque may be added by linking cylindrical axis 130 axes through a friction type mechanism.

Figure 10A:
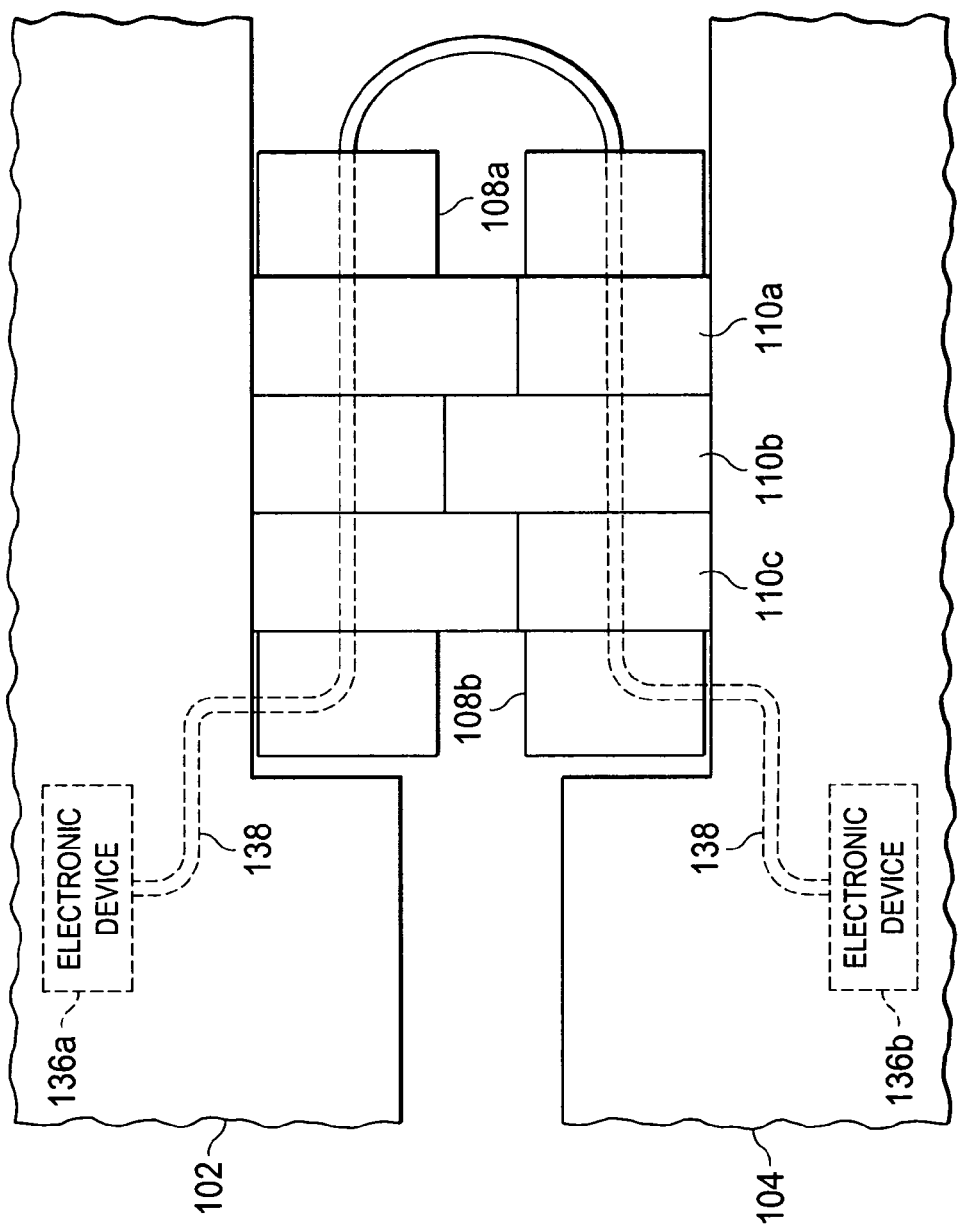
FIG. 10A is a simplified orthographic view illustrating an embodiment of a portion of an electronic device in a flat configuration, in accordance with one embodiment of the present disclosure.
Figure 10B:
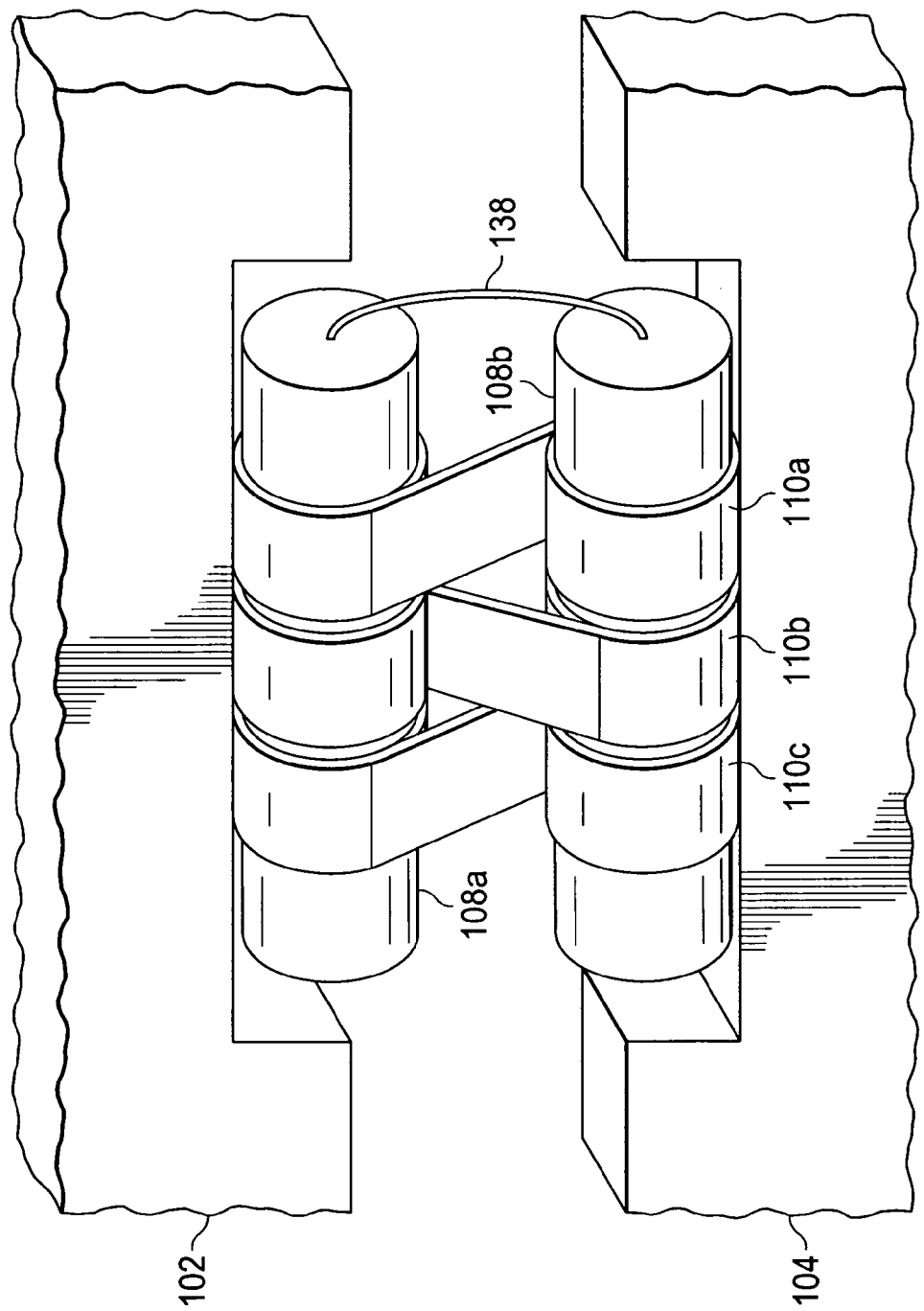
FIG. 10B is a simplified orthographic view illustrating an embodiment of a portion of an electronic device in a flat configuration, in accordance with one embodiment of the present disclosure.

Turning to FIGS. 10A and 10B, FIGS. 10A and 10B are a simplified orthographic view of a portion of an electronic device in accordance with one embodiment of the present disclosure. As illustrated in FIG. 10A, first housing 102 can include an electronic device 136a and second housing 104 can include an electronic device 136b. First electronic device 136a and electronic device 136b may be in communication using coupler 138. In an example, coupler 138 can pass through first body 108a, out of an outside edge of first body 108a, into an outside edge of second body 108b and through second body 108b.

Figure 11A:
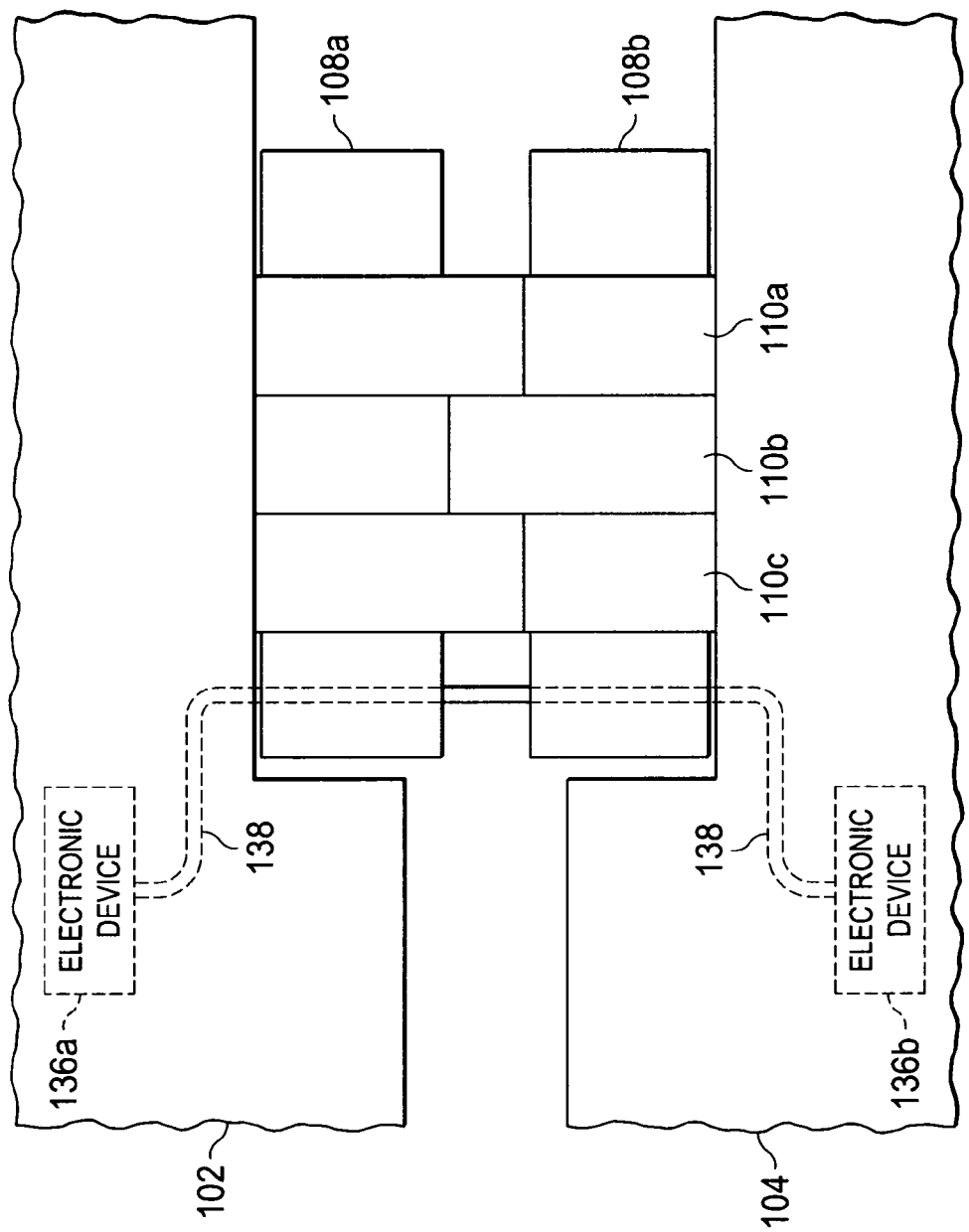
FIG. 11A is a simplified orthographic view illustrating an embodiment of a portion of an electronic device in a flat configuration, in accordance with one embodiment of the present disclosure.
Figure 11B:
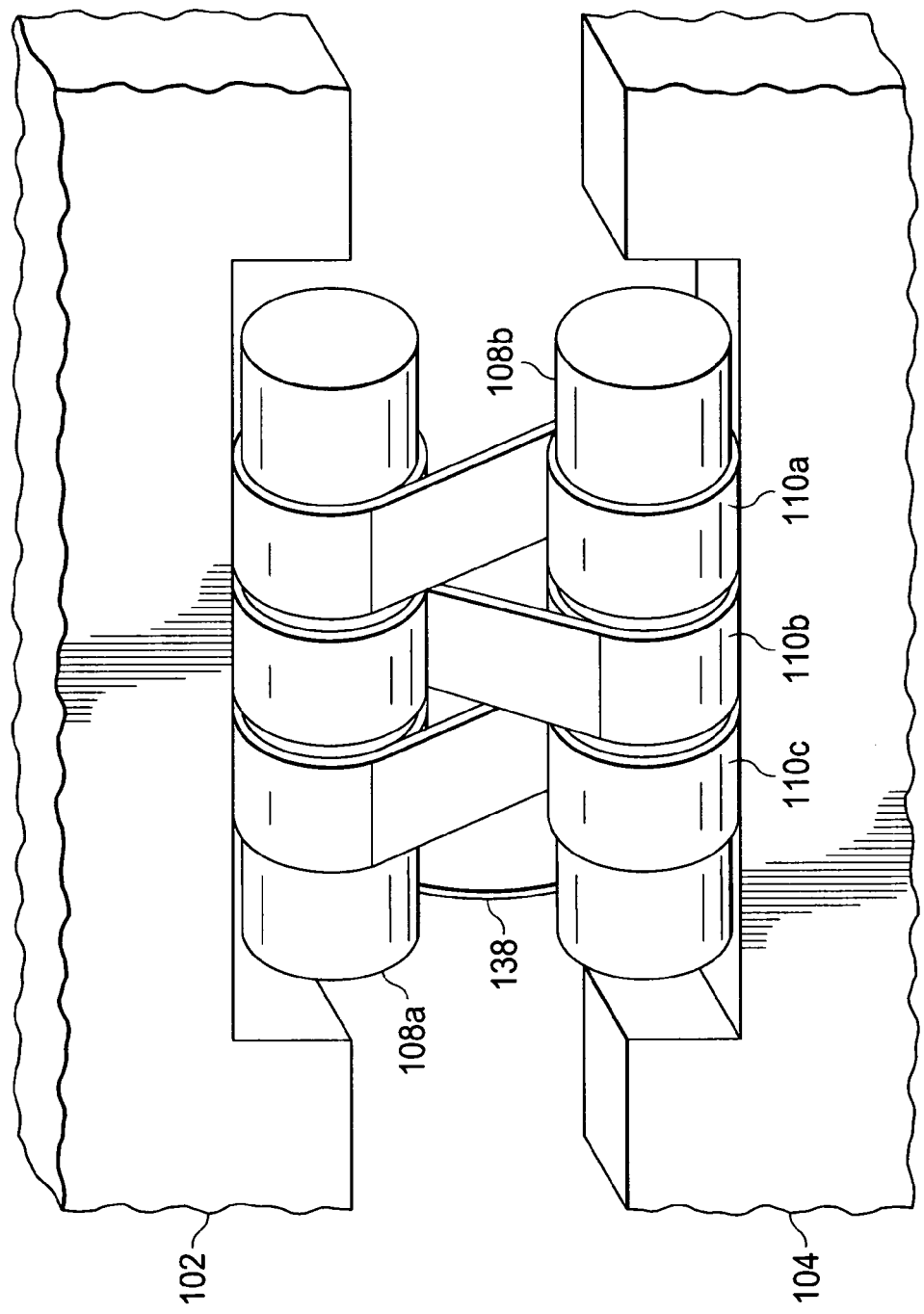
FIG. 11B is a simplified orthographic view illustrating an embodiment of a portion of an electronic device in a flat configuration, in accordance with one embodiment of the present disclosure.

Turning to FIGS. 11A and 11B, FIGS. 11A and 11B are a simplified orthographic view of a portion of an electronic device in accordance with one embodiment of the present disclosure. As illustrated in FIG. 11A, first housing 102 can include electronic device 136a and second housing 104 can include electronic device 136b. First electronic device 136a and electronic device 136b may be in communication using coupler 138. In an example, coupler 138 can pass through first body 108a, between a gap in the space between first housing 102 and second housing 104, and through second body 108b. In another example, first body 108a and second body 108*b* are touching or tangential and coupler can pass through first body 108*a*, directly into second body 108*b*, and through second body 108*b*.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and, modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

One particular example implementation of an electronic device may include activities associated with an orbiting hinge design. The orbiting hinge design allows for a hybrid or convertible laptop hinge that does not have bulky hinge components that can create a large profile, inhibit the functionality, usability, and/or portability of an electronic-device, and have significant industrial design implications. The orbiting hinge can be configured with a first body coupled to a first housing, a second body coupled to a second housing, and two or more taut flexible bands, where the taut flexible bands couple the first body to the second body and allow for timed rotation of the first housing relative to the second housing. In an example, the hinge is a low profile hinge. In addition, the first housing has a first thickness and the second housing has a second thickness and the first thickness is different than the second thickness. Also, the hinge can lay relatively flat on a planer surface. Further, the hinge can rotate about three hundred and sixty degrees. In some examples, the first body is tangential to the second body. Also, an axis of rotation for the first body is parallel to an axis of rotation for the second body.

OTHER NOTES AND EXAMPLES

Example A1 is an electronic device that includes a first body coupled to a first housing, a second body coupled to a second housing, and two or more taut flexible bands, where the taut flexible bands couple the first body to the second body and allow for timed rotation of the first housing relative to the second housing.

In Example A2, the subject matter of Example A1 may optionally include where the hinge is a low profile hinge.

In Example A3, the subject matter of any of the preceding 'A' Examples can optionally include where the first housing has a first thickness and the second housing has a second thickness that is different than the first thickness.

In Example A4, the subject matter of any of the preceding 'A' Examples can optionally include where the hinge can lay relatively flat on a planer surface.

In Example A5, the subject matter of any of the preceding 'A' Examples can optionally include where the hinge can allow the first housing to rotate about three hundred and sixty degrees relative to the second housing.

In Example A6, the subject matter of any of the preceding 'A' Examples can optionally include where the first body is tangential to the second body.

In Example A7, the subject matter of any of the preceding 'A' Examples can optionally include where an axis of rotation for the first body is parallel to an axis of rotation for the second body.

Example M1 is a method that includes rotating a first housing around a second housing using a hinge. The hinge includes a first body coupled to a first housing, a second body coupled to a second housing, and two or more taut flexible bands, where the taut flexible bands couple the first body to the second body and allow for timed rotation of the first housing relative to the second housing.

In Example M2, the subject matter of any of the preceding 'M' Examples can optionally include where the hinge is a low profile hinge.

In Example M3, the subject matter of any of the preceding 'M' Examples can optionally include where the hinge can lay relatively flat on a planer surface.

In Example M4, the subject matter of any of the preceding 'M' Examples can optionally include where wherein the hinge can allow the first housing to rotate about three hundred and sixty degrees relative to the second housing.

In Example M5, the subject matter of any of the preceding 'M' Examples can optionally include where the first body is tangential to the second body.

In Example M6, the subject matter of any of the preceding 'M' Examples can optionally include where an axis of rotation for the first body is parallel to an axis of rotation for the second body.

Example AA1 can include an electronic device that includes a first body coupled to a first housing, where the first housing includes a display, a second body coupled to a second housing, where the second housing includes a keyboard, and two or more taut flexible bands, where the taut flexible bands couple the first body to the second body and allow for timed rotation of the first housing relative to the second housing.

In Example AA2, the subject matter of any of the preceding 'AA' Examples can optionally include where the hinge is a low profile hinge.

In Example AA3, the subject matter of any of the preceding 'AA' Examples can optionally include where the first housing has a first thickness and the second housing has a second thickness that is different than the first thickness.

In Example AA4, the subject matter of any of the preceding 'AA' Examples can optionally include where the first segment and the second segment comprise a hinge and wherein the hinge can lay relatively flat on a planer surface.

In Example AA5, the subject matter of any of the preceding 'AA' Examples can optionally include where the hinge can allow the first housing to rotate about three hundred and sixty degrees relative to the second housing.

In Example AA6, the subject matter of any of the preceding 'AA' Examples can optionally include where the first body is tangential to the second body.

In Example AA7, the subject matter of any of the preceding 'AA' Examples can optionally include where an axis of rotation for the first body is parallel to an axis of rotation for the second body.

Example X1 is a machine-readable storage medium including machine-readable instructions to implement a method or realize an apparatus as in any one of the Examples A1-7 AA1-AA7, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   a first body coupled to a first housing, wherein the first housing includes a display, wherein the first body is cylindrical with a first body first end, a first body second end, a first body first portion located proximate to the first body first end, a first body second portion located proximate to the first body second end, and a first body middle portion between the first body first portion and the first body second portion;
   a second body coupled to a second housing, wherein the second housing includes a keyboard, wherein the second body is cylindrical with a second body first end, a second body second end, a second body first portion located proximate to the second body first end, a second body second portion located proximate to the second body second end, and a second body middle portion between the second body first portion and the second body second portion;
   a fixed member coupled to the first body first end and the second body first end to help keep the first body at a constant distance relative to the second body; and
   two or more taut flexible bands, wherein the taut flexible bands couple the first body to the second body with almost no gap between the first body and the second body and allow for timed orbiting of the first body around the second body and the consequent rotation of the first housing relative to the second housing, wherein the two or more taut flexible bands are located on the first body first portion and the second body first portion and between the fixed member and the first body middle portion and the second body middle portion.

2. The electronic device of claim 1, wherein the two or more taut flexible bands are part of a low profile hinge that rotatably couples the first housing to the second housing, wherein the low profile hinge can allow the first housing to rotate about three hundred and sixty degrees relative to the second housing, wherein the low profile hinge has a total thickness of less than 10 mm during the three hundred and sixty degrees of rotation.

3. The electronic device of claim 1, wherein the first housing has a first thickness and the second housing has a second thickness that is different than the first thickness.

4. The electronic device of claim 2, wherein the low profile hinge can allow the first housing and the second housing to lay relatively flat on a planer surface.

5. The electronic device of claim 1, wherein the first body is tangential to the second body.

6. The electronic device of claim 1, wherein an axis of rotation for the first body is parallel to an axis of rotation for the second body.

7. The electronic device of claim 1 further comprising:
   a second fixed member coupled to the first body second end and the second body second end to help keep the first body at a constant distance relative to the second body; and
   two or more side taut flexible bands, wherein the side taut flexible bands couple the first body to the second body with almost no gap between the first body and the second body and allow for timed orbiting of the first body around the second body and the consequent rotation of the first housing relative to the second housing, wherein the two or more side taut flexible bands are located on the first body second portion and the second body second portion and between the second fixed member and the first body middle portion and the second body middle portion.

* * * * *